US011788338B2

United States Patent
Akimoto et al.

(10) Patent No.: US 11,788,338 B2
(45) Date of Patent: Oct. 17, 2023

(54) PINCH DETECTION SWITCH AND PINCH DETECTION METHOD

(71) Applicant: Hitachi Metals, Ltd., Tokyo (JP)

(72) Inventors: Katsuya Akimoto, Tokyo (JP); Shuichi Suzuki, Tokyo (JP); Katsutoshi Nakatani, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 16/969,706

(22) PCT Filed: Jun. 26, 2018

(86) PCT No.: PCT/JP2018/024171
§ 371 (c)(1),
(2) Date: Aug. 13, 2020

(87) PCT Pub. No.: WO2019/159388
PCT Pub. Date: Aug. 22, 2019

(65) Prior Publication Data
US 2021/0002941 A1     Jan. 7, 2021

(30) Foreign Application Priority Data
Feb. 15, 2018 (JP) .................. 2018-025422

(51) Int. Cl.
| E05F 15/40 | (2015.01) |
| E05F 15/46 | (2015.01) |
| E05F 15/44 | (2015.01) |

(52) U.S. Cl.
CPC ............ *E05F 15/46* (2015.01); *E05F 15/443* (2015.01)

(58) Field of Classification Search
CPC ......... E05F 15/46; E05F 15/443; B60J 10/24; B60J 10/273
(Continued)

(56) References Cited

U.S. PATENT DOCUMENTS

| 3,056,628 A | * | 10/1962 | Golde | .................... | H01H 35/00 |
| | | | | | 200/61.43 |
| 5,023,418 A | * | 6/1991 | Beckhausen | .............. | F16P 3/12 |
| | | | | | 200/61.43 |

(Continued)

FOREIGN PATENT DOCUMENTS

| CN | 1046244 A | 10/1990 |
| CN | 1350612 A | 5/2002 |

(Continued)

OTHER PUBLICATIONS

International Search Report For Serial No. PCT/JP2018/024171 dated Sep. 25, 2018.

(Continued)

*Primary Examiner* — Jerry E Redman
(74) *Attorney, Agent, or Firm* — McCormick, Paulding & Huber, PLLC (57) ABSTRACT

The present invention relates to a pinch detection switch (1) that includes one tubular pressure-sensitive detection member (5) having a plurality of electrode wires spaced apart from one another, and a cover member (4) covering the pressure-sensitive detection member. When the cover member (4) is viewed in cross section, the cover member (4) includes a base portion (4-1), a hollow portion (6), and a deformation portion (4-2) provided on the base portion (4-1) so as to cover the hollow portion (6). The pressure-sensitive detection member (5) is arranged in the deformation portion (4-2), and a receiving portion (9) configured to receive the pressure-sensitive detection member (5) is arranged on the base portion (4-1). The receiving portion (9) has at least two receiving surfaces (9-1, 9-3) formed at positions facing the pressure-sensitive detection member (5), the two receiving surfaces being configured to receive the pressure-sensitive detection member.

20 Claims, 7 Drawing Sheets (58) Field of Classification Search
USPC .................................................. 49/26, 27, 28
See application file for complete search history.

(56) References Cited

U.S. PATENT DOCUMENTS

| | | | | |
|---|---|---|---|---|
| 5,072,080 | A * | 12/1991 | Beckhausen | H01B 7/108 200/61.43 |
| 5,459,962 | A * | 10/1995 | Bonne | E05F 15/443 200/61.43 |
| 6,107,580 | A * | 8/2000 | Hoshikawa | H01H 3/142 200/61.43 |
| 6,233,872 | B1 * | 5/2001 | Glagow | B60J 10/82 49/27 |
| 6,429,375 | B1 * | 8/2002 | Beckhausen | H01B 7/104 200/61.42 |
| 7,000,352 | B2 * | 2/2006 | Ishihara | E05F 15/44 49/28 |
| 8,493,081 | B2 * | 7/2013 | Bolbocianu | E05F 15/443 73/862.391 |
| 9,234,979 | B2 * | 1/2016 | Bolbocianu | E05F 15/443 |
| 9,417,099 | B2 * | 8/2016 | Bolbocianu | G01V 3/02 |
| 9,441,408 | B2 * | 9/2016 | Matsumoto | H01H 3/142 |
| 9,477,003 | B2 * | 10/2016 | Pribisic | G01D 5/24 |
| 9,759,003 | B2 * | 9/2017 | Hirakawa | B60J 10/273 |
| 10,659,043 | B2 * | 5/2020 | Nakatani | G01D 5/24 |
| 10,662,693 | B2 * | 5/2020 | Kawase | E05F 15/44 |
| 2004/0107640 | A1 * | 6/2004 | Ishihara | E05F 15/44 49/27 |
| 2006/0191203 | A1 * | 8/2006 | Ueda | G01L 1/16 49/27 |
| 2011/0128018 | A1 * | 6/2011 | Reime | E05F 15/46 174/70 R |
| 2011/0169513 | A1 * | 7/2011 | Bolbocianu | E05F 15/443 324/705 |
| 2013/0307567 | A1 * | 11/2013 | Bolbocianu | G01D 5/16 324/661 |
| 2014/0318934 | A1 * | 10/2014 | Aoyama | E05F 15/443 200/61.42 |
| 2015/0267453 | A1 * | 9/2015 | Matsumoto | B60J 5/06 49/27 |
| 2015/0369941 | A1 * | 12/2015 | Pribisic | G01D 5/16 324/658 |
| 2016/0104585 | A1 * | 4/2016 | Clemente | F16P 3/12 200/600 |
| 2016/0144802 | A1 * | 5/2016 | Hirakawa | B60R 13/02 296/1.08 |
| 2016/0145927 | A1 * | 5/2016 | Hirakawa | B60J 10/273 296/1.04 |
| 2019/0145146 | A1 * | 5/2019 | Linden | E05F 15/40 49/28 |
| 2019/0210259 | A1 * | 7/2019 | Hattori | B29C 45/1742 |
| 2019/0390501 | A1 * | 12/2019 | Kawase | E06B 7/23 |
| 2020/0157871 | A1 * | 5/2020 | Ten-Jet-Foei | E05F 15/443 |
| 2021/0002941 | A1 * | 1/2021 | Akimoto | E05F 15/44 |
| 2021/0095512 | A1 * | 4/2021 | Matsumoto | E05F 15/44 |
| 2021/0107340 | A1 * | 4/2021 | Ishibashi | E05F 15/44 |
| 2021/0109246 | A1 * | 4/2021 | Matsumoto | B60J 10/24 |

FOREIGN PATENT DOCUMENTS

| | | | | |
|---|---|---|---|---|
| CN | 1508523 | A | 6/2004 | |
| CN | 101236258 | A | 8/2008 | |
| CN | 104769695 | A | 7/2015 | |
| CN | 204876980 | U | 12/2015 | |
| DE | 102011008275 | A1 * | 7/2012 | ............. B60J 5/107 |
| EP | 0 782 158 | A2 | 7/1997 | |
| EP | 3533964 | A1 | 9/2019 | |
| JP | S58-110185 | A | 7/1983 | |
| JP | H10-281906 | A | 10/1998 | |
| JP | H11-191338 | A | 7/1999 | |
| JP | 2000343937 | A | 12/2000 | |
| JP | 3107973 | U | 4/2005 | |
| JP | 2012181957 | A | 9/2012 | |
| JP | 2014216300 | A | 11/2014 | |

OTHER PUBLICATIONS

Office Action issued for Chinese Patent Application No. 201880088980.1, dated Mar. 18, 2022 and its English translation.
Notice of Second Office Action issued for Chinese Patent Application No. 201880088980.1, dated Jan. 10, 2023 and its English translation.

* cited by examiner

PINCH DETECTION SWITCH AND PINCH DETECTION METHOD

CROSS-REFERENCE TO RELATED APPLICATIONS

This application is a National Stage application of International Patent Application No. PCT/JP2018/024171, filed on Jun. 26, 2018, which claims priority to Japanese Patent Application No. 2018-025422 filed on Feb. 15, 2018, each of which is hereby incorporated by reference in its entirety.

TECHNICAL FIELD

The present invention relates to a pinch detection switch and a pinch detection method, and, for example, relates to a pinch detection switch and a pinch detection method installed in a vehicle such as an automobile.

BACKGROUND

Techniques regarding a pinch detection switch installed in an automobile are described in, for example, Japanese Patent Application Laid-Open Publication No. 2000-343937 and Japanese Patent Application Laid-Open Publication No. 2014-216300. Japanese Patent Application Laid-Open Publication No. 2000-343937 describes a pinch detection switch provided on a power window. The pinch detection switch of Japanese Patent Application Laid-Open Publication No. 2000-343937 comprises a gap portion and a pressure-sensitive portion, and is a pressure-sensitive type detection switch configured to detect pinching at the pressure-sensitive portion. In addition, Japanese Patent Application Laid-Open Publication No. 2014-216300 describes a pinch detection switch provided on a sliding door of an automobile. In the pinch detection switch of Japanese Patent Application Laid-Open Publication No. 2014-216300, an elastic hollow tubular member is deformed such that a plurality of electrode wires spaced apart from one another in the tubular member are brought in close proximity, whereby electrical resistance between the electrode wires is changed. This change in electrical resistance allows external force applied to the tubular member to be detected. In other words, the pinch detection switch of Japanese Patent Application Laid-Open Publication No. 2014-216300 is a pressure-sensitive type pinch detection switch configured to detect that an external force is applied to the tubular member.

SUMMARY

For example, in the technique of Japanese Patent Application Laid-Open Publication No. 2014-216300, in order to better mitigate impact of a sliding door of an automobile on a part of a person's body when it comes into contact, it would be necessary to increase cushioning of the rubber cover member covering, for example, the tubular member. However, increasing cushioning of the cover member would allow external force on the tubular member to be absorbed, making it difficult to properly detect pinching.

In addition, for example, in the technique of Japanese Patent Application Laid-Open Publication No. 2000-343937, in order to mitigate impact of a power window on a part of a person's body when it comes into contact, it can be considered to increase the size of a gap portion. In this case, it would be difficult for external force to be applied to the pressure-sensitive portion, making it difficult to properly detect pinching.

The present invention has been made in view of the problems described above, and its object is to provide a technique that allows for proper operation of a pressure-sensitive type pinch detection switch even with increased cushioning at the time of contact.

Means for Solving the Problems

The following is a brief overview of a representative embodiment disclosed in the present application.

In other words, the pinch detection switch according to an embodiment comprises one tubular pressure-sensitive detection member having a plurality of electrode wires spaced apart from one another, and a cover member covering the pressure-sensitive detection member. Here, when the cover member is viewed in cross section, the cover member comprises a base portion, a hollow portion, and a deformation portion provided on the base portion so as to cover the hollow portion. A pressure-sensitive detection member is arranged in the deformation portion. A receiving portion configured to receive the pressure-sensitive detection member is arranged on the base portion. The receiving portion has at least two receiving surfaces formed at positions facing the pressure-sensitive detection member, the at least two receiving surfaces being configured to receive the pressure-sensitive detection member.

In addition, the pinch detection switch according to an embodiment comprises one tubular pressure-sensitive detection member having a plurality of electrode wires spaced apart from one another, and a cover member covering the pressure-sensitive detection member. Here, when the cover member is viewed in cross section, the cover member comprises a base portion, a hollow portion, and a deformation portion provided on the base portion so as to cover the hollow portion. A pressure-sensitive detection member is arranged in the deformation portion. A receiving portion configured to receive the pressure-sensitive detection member is arranged on the base portion. The receiving portion has a receiving surface formed at a position facing the pressure-sensitive detection member, the receiving surface being configured to receive the pressure-sensitive detection member in at least two directions.

Effects of the Invention

The following is a brief overview of effects that can be obtained by the representative invention disclosed in the present application.

In other words, it is possible to provide a technique that allows proper operation of the pinch detection switch while increasing cushioning. The receiving portion receives the pressure-sensitive detection member in at least two surfaces or in at least two directions, whereby it is possible to achieve proper operation of the pinch detection switch in accordance with a deformation direction of the pressure-sensitive detection member. In addition, the hollow portion makes it possible to increase cushioning.

DETAILED DESCRIPTION

Hereinafter, each embodiment of the present invention will be described with reference to the drawings. Note that the descriptions are only given as examples, and it is needless to say that those easily conceivable by one skilled in the art regarding modifications in which the subject-matter of the invention is maintained are included in the scope of the invention. In addition, for clarity of explanation, the drawings may be schematically represented in terms of width, thickness, shape and the like of each portion compared to the actual form. However, these are only given as examples and do not limit the interpretation of the present invention.

In addition, in the present description and all of the drawings, elements that are the same as those previously described with reference to the drawings are denoted by the same reference sign, and redundant descriptions thereof may be omitted as appropriate.

First Embodiment

Figure 8:
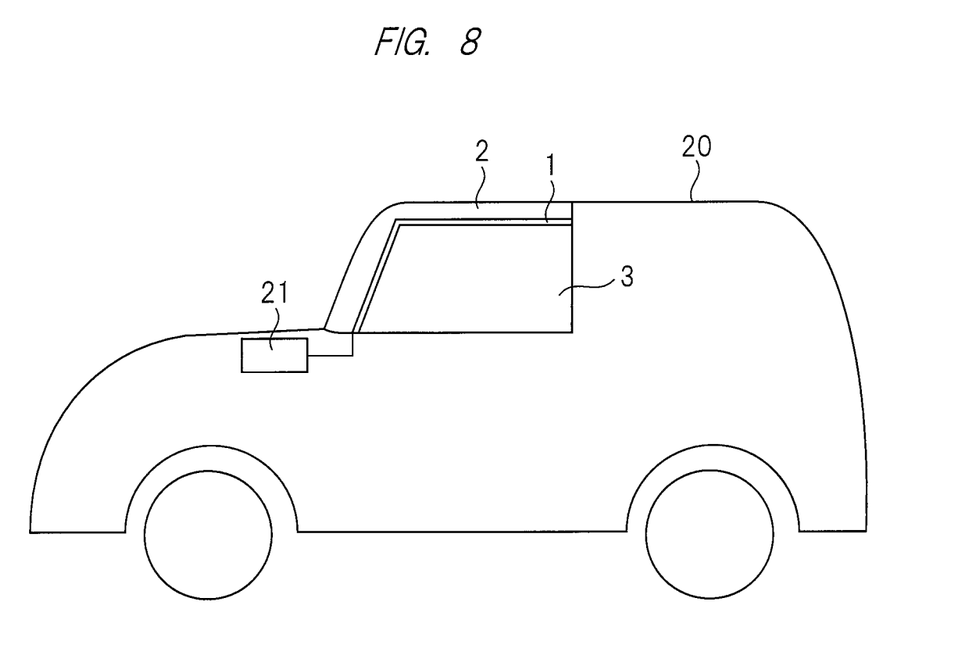
FIG. 8 is a schematic view showing a configuration of an automobile according to the first embodiment.

FIG. 8 is a schematic view showing a configuration of an automobile in which a pinch detection switch according to a first embodiment is installed. Here, an example in which the pinch detection switch is applied to a power window will be described. In FIG. 8, reference sign 2 denotes a window frame of the automobile 20. A windowpane 3 is moved up and down (raised and lowered) by an electric actuator. The window frame 2 is provided with the pinch detection switch 1 according to the first embodiment. When the windowpane 3 is raised and an object (including a part of a person's body) is pinched between the window frame 2 and the windowpane 3, the pinch detection switch 1 detects pinching and provides a detection signal to a controller 21. When provided with the detection signal, the controller 21 stops rising of, for example, the windowpane 3. In this manner, it is possible to prevent injuries and the like by pinching from occurring. In addition, when an object is pinched, it is typical for one to perform pull-out of the object, and the pinch detection switch also detects this pull-out. In particular, when the pinched object is pulled out toward an outer side of the vehicle instead of toward an inner side of the vehicle, it is important to be able to detect pull-out from a safety perspective.

<Pinch Detection Switch>

Figure 1:
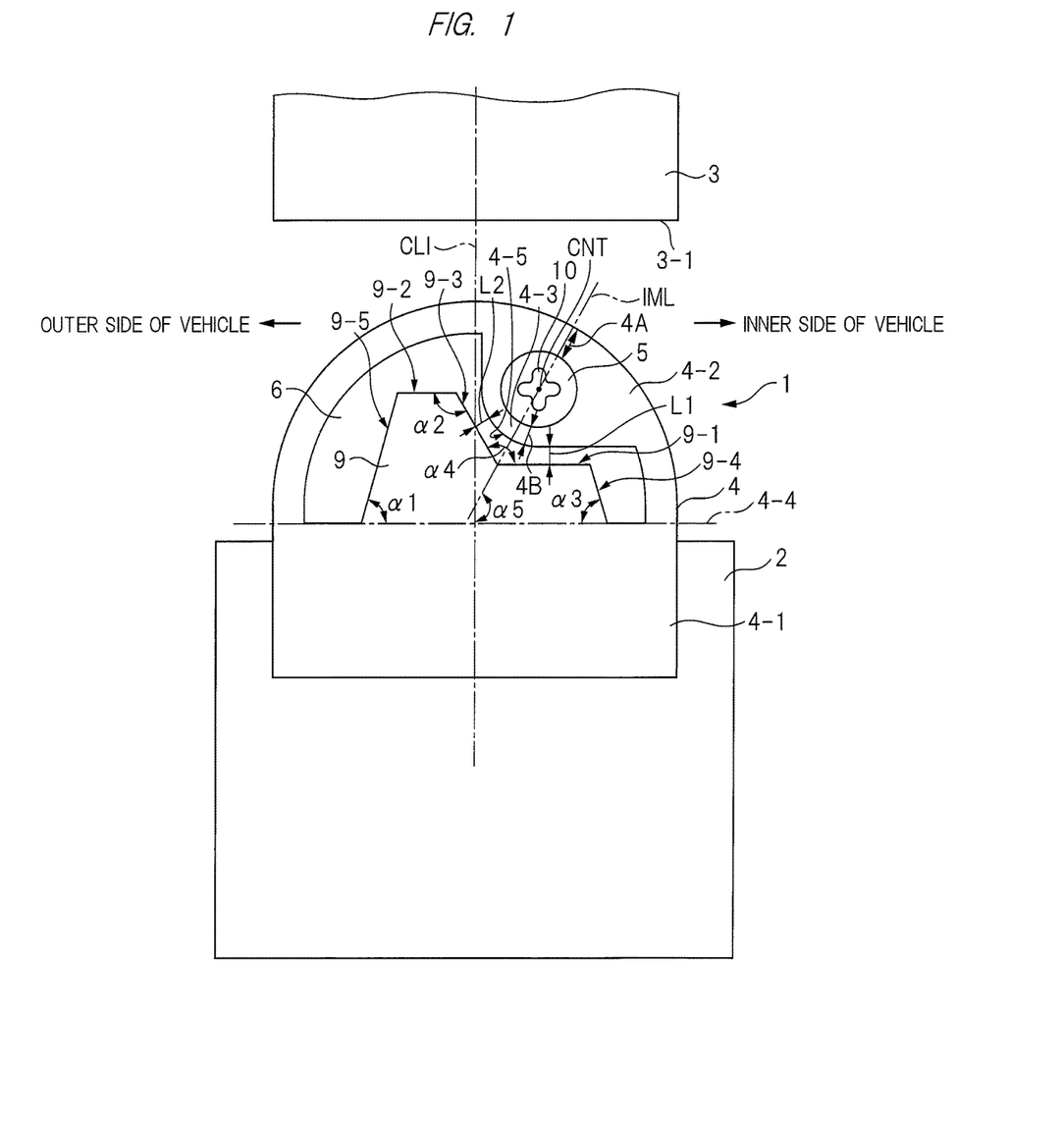
FIG. 1 is a cross-sectional view of a pinch detection switch according to a first embodiment.
Figure 2:
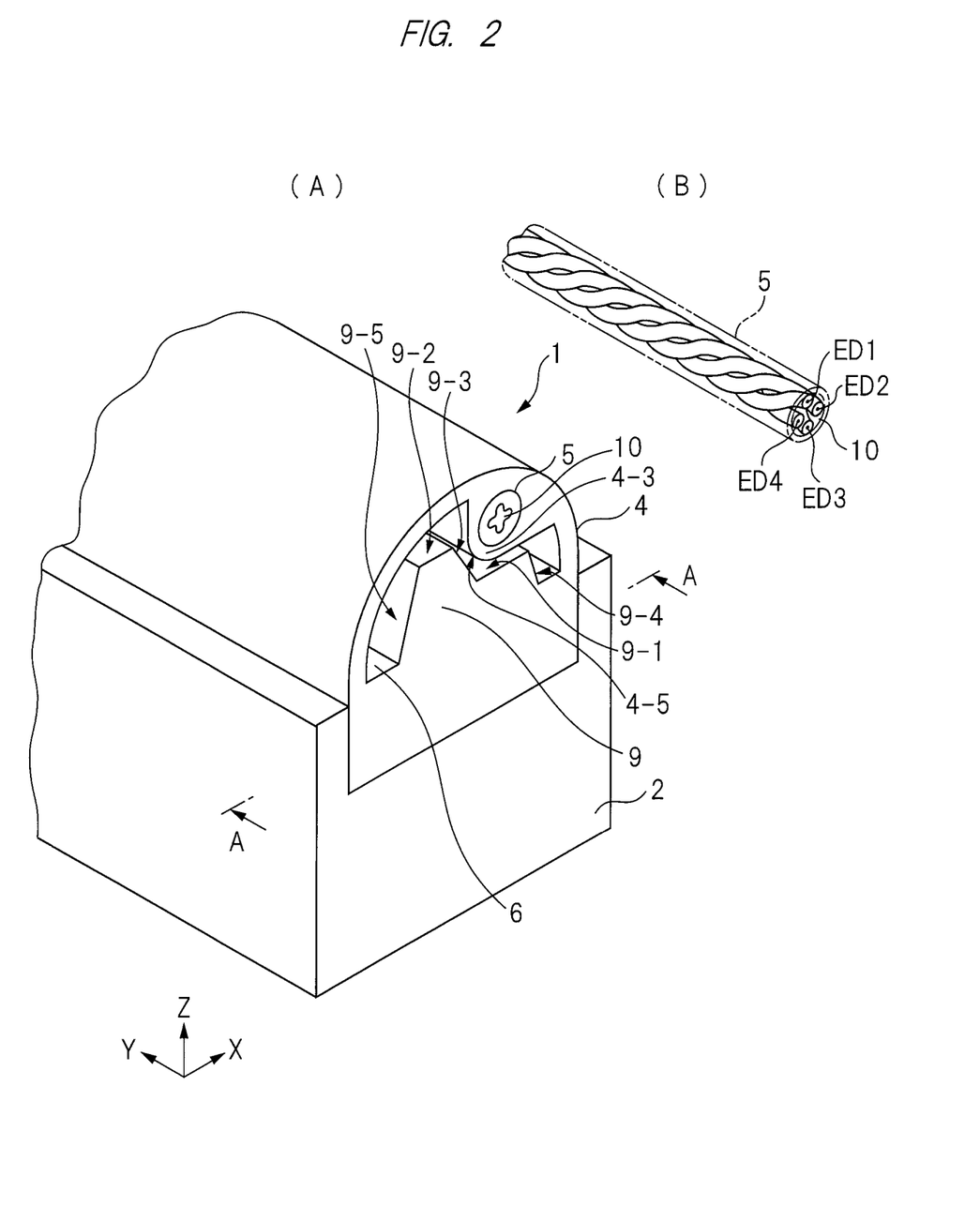
FIGS. 2(A) and 2(B) are perspective views of the pinch detection switch and a pressure-sensitive detection member according to the first embodiment.

FIG. 1 is a cross-sectional view of the pinch detection switch according to the first embodiment. FIG. 2 includes perspective views of the pinch detection switch according to the first embodiment. Here, FIG. 2(A) is a perspective view of the pinch detection switch 1, and FIG. 2(B) is a perspective view of a pressure-sensitive detection member 5 provided in the pinch detection switch 1. FIG. 1 is a cross-sectional view taken a line A-A of FIG. 2(A).

The pinch detection switch 1 extends along an extension direction Y of the window frame 2, and comprises a deformable cover member 4 arranged on the window frame 2. As shown in FIG. 2, the cover member 4 covers the pressure-sensitive detection member 5 extending in the same direction as the cover member 4. The cover member 4 also covers a hollow portion 6 extending in the same direction as the cover member 4. The cover member 4 of the pinch detection switch 1 is, for example, formed from rubber. As shown in FIG. 1, a portion of the cover member 4 is embedded in the window frame 2.

When viewed in cross section as shown in FIG. 1, the cover member 4 comprises a thick base portion 4-1 in contact with the window frame 2, and a deformable elastic deformation portion 4-2 facing a surface 3-1 of the windowpane 3. A space between the base portion 4-1 and the deformation portion 4-2 is defined as the hollow portion 6.

The pressure-sensitive detection member 5 is provided in the deformation portion 4-2 located on one side (right side in FIG. 1) of the cover member 4 with respect to a center line CLI of the cover member 4. The deformation portion 4-2 comprises a cover part 4-3 covering the pressure-sensitive detection member 5. The cover part 4-3 is a portion of the deformation portion 4-2 interposed between the pressure-sensitive detection member 5 and a surface of a receiving portion 9 (described below) facing the pressure-sensitive detection member 5 at the time of pinching and pull-out. In FIG. 1, one side with respect to the center line CLI indicates the inner side of the automobile 20, whereas the other side (left side in FIG. 1) with respect to the center line CLI indicates the outer side of the automobile 20. Therefore, the pressure-sensitive detection member 5 is provided on the inner side of the vehicle in the cover member 4.

The base portion 4-1 is provided with the receiving portion 9 configured to receive the pressure-sensitive detection member 5 when the deformation portion 4-2 is deformed. As shown in FIG. 1, an outer shape of the receiving portion 9 has a protruding shape protruding in a stepwise manner from the base portion 4-1 toward the deformation portion 4-2. In other words, the receiving portion 9 comprises a first upper surface 9-1 parallel to a base surface 4-4 in contact with the base portion 4-1 and the hollow portion 6, a second upper surface 9-2 parallel to the base surface 4-4 and located farther away from the base surface 4-4 than the first upper surface 9-1, a first inclined surface 9-3 connecting the first upper surface 9-1 and the second upper surface 9-2, a second inclined surface 9-4 connecting the first upper surface 9-1 and the base surface 4-4, and a third inclined surface 9-5 connecting the second upper surface 9-2 and the base surface 4-4.

In the first embodiment, an angle α1 between the base surface 4-4 and the third inclined surface 9-5, and an angle α3 between the base surface 4-4 and the second inclined surface 9-4 are each 75 degrees, and an angle α2 between the second upper surface 9-2 and the first inclined surface 9-3 is 120 degrees. In addition, an angle α4 between the first upper surface 9-1 and the first inclined surface 9-3 is 120 degrees.

As shown in FIG. 1, the center line CLI of the cover member 4 passes through the first inclined surface 9-3 connecting the first upper surface 9-1 and the second upper surface 9-2 having different separation distances from the base surface 4-4, whereby the receiving portion 9 has a laterally asymmetric structure with respect to the center line CLI. Like the cover member 4, the receiving portion 9 is also formed from rubber.

When the deformation portion 4-2 is deformed by pinching or pull-out, the pressure-sensitive detection member 5 is pressed against the first upper surface 9-1 and first inclined surface 9-3 of the receiving portion 9 via the cover part 4-3. In other words, the first upper surface 9-1 and first inclined surface 9-3 of the receiving portion 9 face the pressure-sensitive detection member 5, and act as receiving surfaces configured to receive the pressure-sensitive detection member 5.

As shown in FIG. 2(B), the pressure-sensitive detection member 5 is a tubular detection member having electrode wires ED1 to ED4 spaced apart from one another. In the pressure-sensitive detection member 5, the portion surrounding the electrode wires ED1 to ED4 spaced apart from one another has elasticity. When an external force is applied, a hollow portion 10 is deformed such that the separation distance between the electrode wires ED1 to ED4 is changed. The plurality of electrode wires constituting the pressure-sensitive detection member are formed in a spiral shape extending along a longitudinal direction of the pressure-sensitive detection member. This makes it possible to detect the external force from any radial direction of the pressure-sensitive detection member. When the separation distance is changed, electrical resistance between the electrode wires ED1 to ED4 is changed. The change in electrical resistance between the electrode wires ED1 to ED4 is sent to the controller 21 shown in FIG. 8 as a detection signal. The pressure-sensitive detection member 5 is the same as the tubular member recited in the above-described Japanese Patent Application Laid-Open Publication No. 2014-216300, and thus, detailed descriptions thereof will be omitted.

When viewed in cross section as shown in FIG. 1, the pressure-sensitive detection member 5 is arranged on one side with respect to the center line CLI. Imagining that a straight line IML passes through a connecting portion for the first inclined surface 9-3 and first upper surface 9-1 of the receiving portion 9, and passes through a center point CNT of the pressure-sensitive detection member 5, an angle α5 between the imaginary straight line IML and the center line CLI is, for example, 120 degrees.

Figure 3:
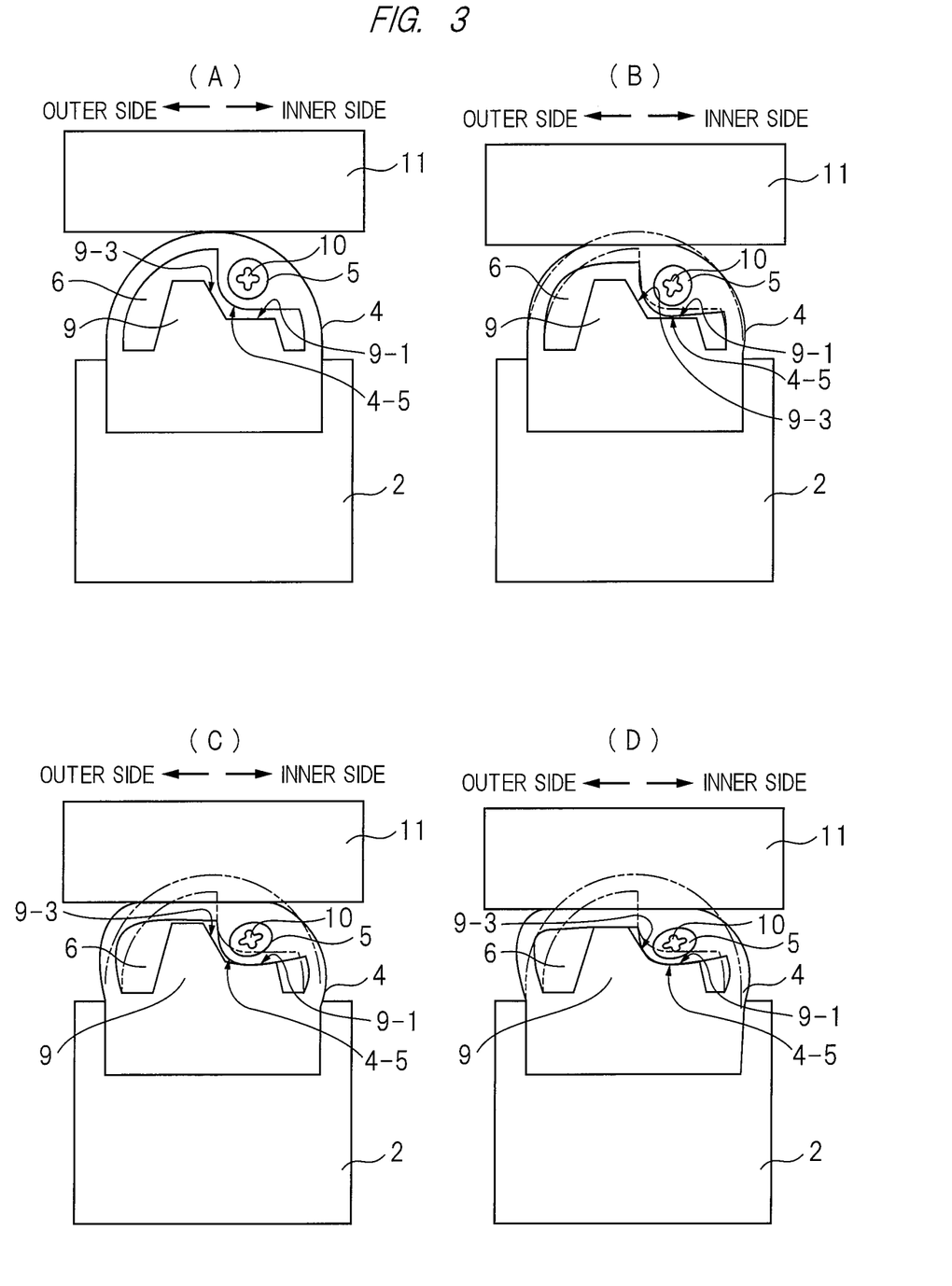
FIGS. 3(A) to 3(D) are cross-sectional views showing a state of the pinch detection switch according to the first embodiment.
Figure 4:
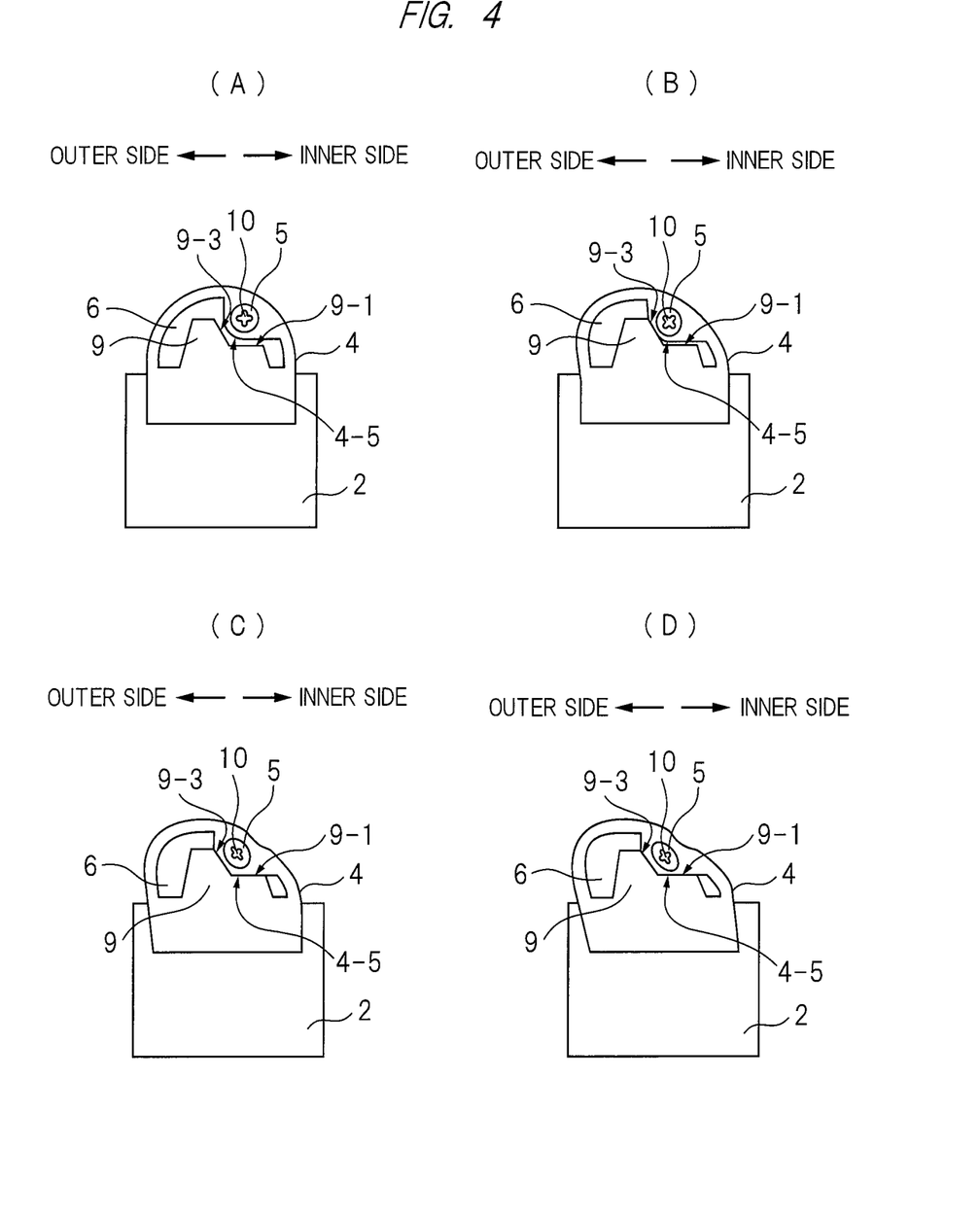
FIGS. 4(A) to 4(D) are cross-sectional views showing a state of the pinch detection switch according to the first embodiment.

As will be described below with reference to FIGS. 3 and 4, pinching or pull-out allows the pressure-sensitive detection member 5 to be moved toward the first upper surface 9-1 and first inclined surface 9-3 of the receiving portion 9 and to be deformed so as to be crushed. When the pressure-sensitive detection member 5 is crushed, pinching is detected by the above-described detection signal. A detection sensitivity at this time can be determined by distances L1 and L2 between the cover part 4-3 of the undeformed deformation portion 4-2 and the first upper surface 9-1 and first inclined surface 9-3 of the receiving portion 9, and by the angle α4 between the first upper surface 9-1 and the first inclined surface 9-3. In this case, the shorter the distances L1 and L2, the higher the detection sensitivity can be. The angle α4 can be changed within a range of 90 degrees or more and less than 180 degrees. Reducing the angle α4 allows detection sensitivity at the time of pull-out from the outer side of the vehicle to be increased. In the first embodiment, an angle of 120 degrees is desirably adopted as the angle α4. However, the above-described distances L1, L2, and the angle α4 may be set according to the required detection sensitivity. For example, it is preferable to set α4 within a range of 90 degrees or more and 135 degrees or less.

At the time of detection of pinching and pull-out, the first upper surface 9-1 and first inclined surface 9-3 of the receiving portion 9 are in contact with a surface 4-5 of the cover part 4-3. In order to facilitate deformation (crushing) of the pressure-sensitive detection member 5, it is desirable to set a wall thickness 4B of the cover member 4 interposed between the surface 4-5 and a surface of the pressure-sensitive detection member 5 to be thinner than a wall thickness 4A of the cover member 4 interposed between the surface of the pressure-sensitive detection member 5 and an outer surface of the deformation portion 4-2.

As shown in FIG. 1, a second inclined surface 9-5 and a third inclined surface 9-4 which are side surfaces of the receiving portion 9 configured to receive the pressure-sensitive detection member 5 are inclined (α1, α2=75 degrees in FIG. 1), so that the receiving portion 9 becomes wider as it gets closer to the base surface 4-4. In this manner, when the pressure-sensitive detection member 5 is pressed against the first upper surface 9-1 and the first inclined surface 9-3 which are receiving surfaces, it is possible to reduce deformation of the receiving portion 9 along a direction in which it is pressed. As a result, it is possible to suppress external pressure applied to the pressure-sensitive detection member 5 from being absorbed by deformation of the receiving portion 9.

<Pinching>

Next, an operation that takes place when an object is pinched will be described. FIG. 3 includes cross-sectional views showing states where an object 11 is pinched in the pinch detection switch 1 according to the first embodiment. FIG. 3(A) shows an initial state where the object 11 is not pinched. FIG. 3(B) shows a state where the object 11 is pinched, and by this pinching, the deformation portion 4-2 of the cover member 4 is pushed in as compared to the initial state. As a load applied to the object 11 increases, a pushed-in amount of the deformation portion 4-2 increases in the order of FIGS. 3(C) and 3(D). In FIGS. 3(B) to 3(D), two-dot chain lines denote the shape of the deformation portion at the initial state shown in FIG. 3(A).

As shown in FIGS. 3(B), 3(C) and 3(D), as the pushed-in amount increases, the deformation portion 4-2 in contact with the object 11 is deformed so as to be moved toward the receiving portion 9. In this manner, the pressure-sensitive detection member 5 begins to deform so as to be crushed. In FIG. 3(B), the surface 4-5 (see FIG. 1) of the cover part 4-3 comes in contact with the first upper surface 9-1 which is the receiving surface, further allowing crushing of the pressure-sensitive detection member 5 to proceed. In addition, in FIG. 3(D), the surface 4-5 of the cover part 4-3 also comes in contact with the first inclined surface 9-3 which is the receiving surface, allowing crushing of the pressure-sensitive detection member 5 to proceed.

For example, with a value of the detection signal at for an amount of push-in as shown in FIG. 3(D), the controller 21 (FIG. 8) stops movement of, for example, the windowpane 3. The cover member 4 is provided with the hollow portion 6, whereby the hollow portion 6 acts as a cushion and reduces the load applied to the pinched object while making it possible to properly detect pinching.

<Pull-Out>

Next, an operation that takes place when the object is pulled out will be described. FIG. 4 includes cross-sectional views showing states where the pinch detection switch 1 according to the first embodiment detects pull-out of the object. The drawings in FIG. 4 show states of the cover member 4 when the object is pulled out from the outer side of the vehicle.

FIG. 4(A) shows an initial state where the cover member 4 of the pinch detection switch 1 is not deformed. FIG. 4(B) shows a state where, by pull-out of the object, the cover member 4 is deformed and the cover member 4 on the inner side of the vehicle is pushed in as compared to the initial state of FIG. 4(A). As a pull-out load of the object further increases, the pushed-in amount of the cover member 4 increases in the order of FIGS. 4(C) and 4(D).

As shown in FIGS. 4(B) to 4(D), when the pull-out load increases, the deformation portion 4-2 of the cover member 4 is deformed, whereby the pressure-sensitive detection member 5 is also be deformed so as to be crushed. In a case of pull-out toward the outer side of the vehicle, the deformation portion 4-2 is deformed as shown in FIG. 4(B) such that, first, the surface 4-5 of the cover part 4-3 (see FIG. 1) comes in contact with the first inclined surface 9-3 which is the receiving surface, pressure is applied to the pressure-sensitive detection member 5, and the pressure-sensitive detection member 5 is crushed. Then, as shown in FIG. 4(C), the surface 4-5 of the cover part 4-3 comes in contact with the first upper surface 9-1 which is the receiving surface, pressure is applied to the pressure-sensitive detection member 5, and the pressure-sensitive detection member 5 is crushed. Further, as shown in FIG. 4(D), crushing of the pressure-sensitive detection member 5 proceeds.

For example, the controller 21 determines that a pull-out operation exists from a value of the detection signal at the state shown in FIG. 4(D).

In this manner, in a case where a pull-out operation takes place, the pressure-sensitive detection member 5 is first crushed by the first inclined surface 9-3 which is receiving surface. Therefore, it is possible for the pinch detection switch 1 according to the first embodiment to properly detect pinching even in a case of pull-out. In addition, the hollow portion 6 of the cover member 4 acts as a cushion, whereby it is possible to reduce the load on the object.

The receiving portion 9 may be integrally formed with the base portion 4-1, or the receiving portion 9 may be a separate member from the cover member 4 prepared to be attached to the base portion 4-1 of the cover member 4. Likewise, the pressure-sensitive detection member 5 may be integrally formed with the cover member 4, or may be a separate member from the cover member 4 prepared to be attached to the cover member 4.

In addition, an example in which the pressure-sensitive detection member 5 is arranged on the inner side of the vehicle with respect to the center line CLI of the cover member 4 has been described. However, it may be configured such that the pressure-sensitive detection member 5 is arranged on the outer side of the vehicle. This makes it possible to properly detect pull-out toward the inner side of the vehicle. However, it is desirable to arrange the pressure-sensitive detection member 5 on the inner side of the vehicle from a safety perspective as described above.

The first upper surface 9-1 and first inclined surface 9-3 of the receiving portion 9 have been described as receiving surfaces configured to receive the pressure-sensitive detection member 5. However, it is understood that the pressure-sensitive detection member 5 is moved toward the first upper surface 9-1 at the time of pinching, and is moved toward the first inclined surface 9-3 at the time of pull-out. Therefore, it can be understood that the receiving portion 9 comprises a receiving surface configured to receive the pressure-sensitive detection member 5 in at least two directions. Here, it is preferable that an angle formed by the two directions is 45 degrees or more and 90 degrees or less.

MODIFICATION EXAMPLES

Figure 5:
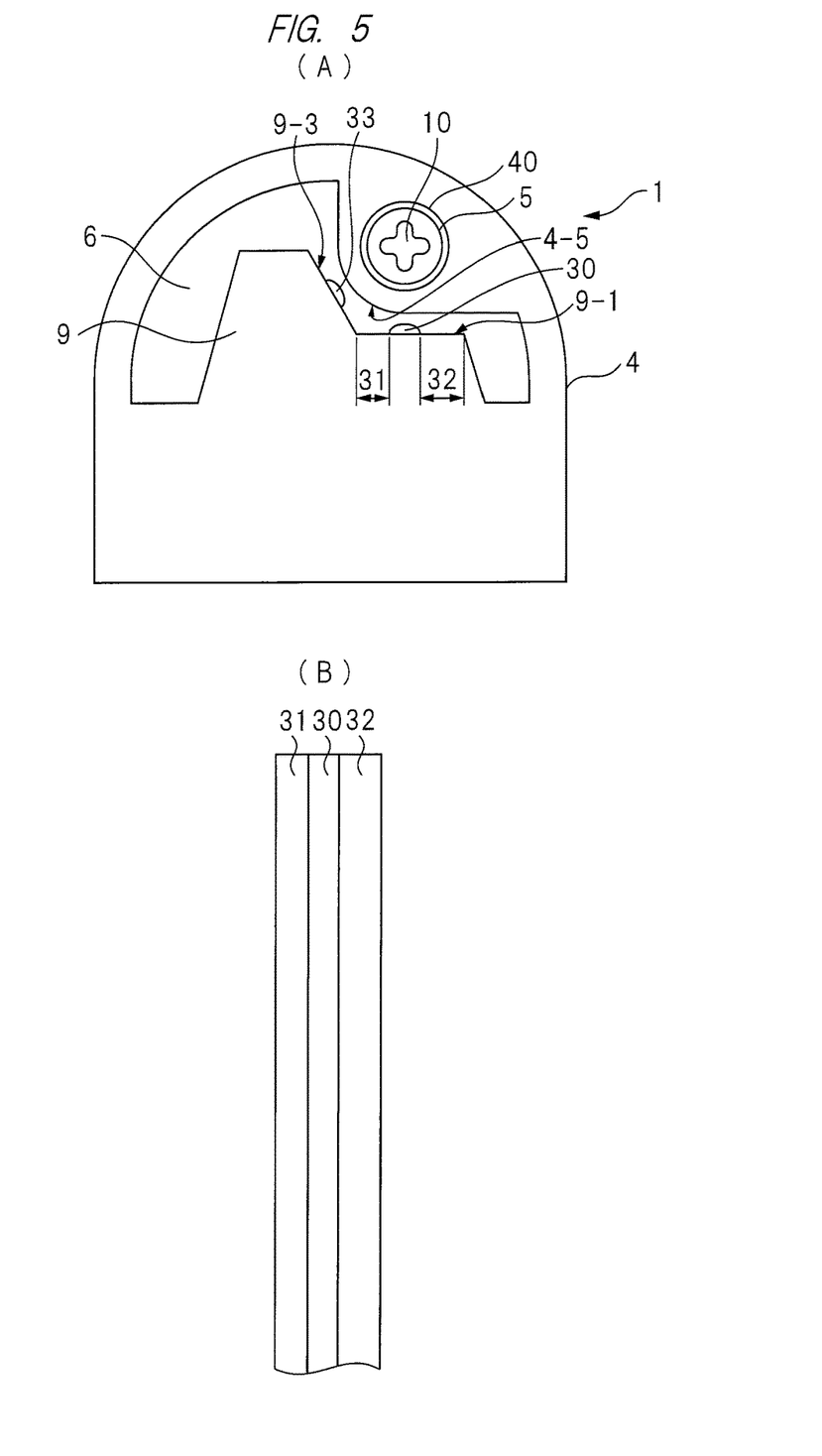
FIGS. 5(A) and 5(B) are cross-sectional and partial plan views showing a configuration of the pinch detection switch according to a modification example of the first embodiment.

Hereinafter, three modification examples will be described. Two modification examples will first be described with reference to FIG. 5. FIG. 5(A) is a cross-sectional view showing a configuration of the pinch detection switch according to a modification example of the first embodiment. In addition, FIG. 5(B) is a partial plan view of the pinch detection switch shown in FIG. 5(A).

First Modification Example

In a first modification example, when the cover member 4 is viewed in cross section, convex portions 30 and 33 protruding toward the pressure-sensitive detection member 5 are arranged on the first upper surface 9-1 and the first inclined surface 9-3 which are receiving surfaces. By arranging such convex portions 30 and 33, it is possible to facilitate crushing of the pressure-sensitive detection member 5 when detecting pinching.

In this case, the convex portions 30 and 33 may be integrally formed with the receiving portion 9, or may be separately formed to be attached to the first upper surface 9-1 and the first inclined surface 9-3. In addition, the convex portions may be arranged on either one of the first upper surface 9-1 and the first inclined surface 9-3.

Further, when the first upper surface 9-1 is viewed from a side of the pressure-sensitive detection member 5 as shown in the plan view of FIG. 5(B), a region of the convex portion 30 and regions 31 and 32 where no convex portion 30 is arranged may be arranged in a belt-like manner. Likewise, in the first inclined surface 9-3, the convex portion 33 and a region where no convex portion 33 is arranged may be arranged in a belt-like manner. Such belt-like convex portions can be easily produced by extrusion molding.

In addition, the convex portions 30 and 33 may be provided on the cover part 4-3 of the pressure-sensitive detection member 5.

Second Modification Example

In a second modification example, the pressure-sensitive detection member 5 is prepared as a separate member from the cover member 4. As shown in FIG. 5(A), in the second modification example, an insertion opening 40 is formed in the cover member 4. The pressure-sensitive detection member 5 prepared as a separate member is inserted into the insertion opening 40. In the second modification example, an area of the insertion opening 40 is made to be larger than an area of the pressure-sensitive detection member 5. In this manner, when the pressure-sensitive detection member 5 is being inserted into the insertion opening 40, it is possible to prevent the pressure-sensitive detection member 5 from being twisted.

In addition, in the second modification example, the insertion opening 40 may have an elliptical shape. Further, the insertion opening 40 may be filled with an adhesive, and then, the pressure-sensitive detection member 5 may be inserted into the insertion opening 40.

As described above, the pinch detection switch 1 according to the first embodiment provides increased cushioning and allows proper operation at the time of pinching and pull-out.

Third Modification Example

Next, a third modification example will be described with reference to FIG. 1. In the third modification example, two pressure-sensitive detection members 5 are provided in the cover member 4, and the outer shape of the receiving portion 9 is changed. In other words, a structure of the cover member 4 according to the third modification example includes a structure in which the configuration on one side (right side in FIG. 1) with respect to the center line CLI in FIG. 1 is flipped with respect to the center line CLI. In this manner, in the deformation portion 4-2 of the cover member 4, the pressure-sensitive detection member similar to that on the one side is also arranged on the other side as a second pressure-sensitive detection member. In addition, the receiving portion 9 has an outer shape in which one side is provided with the first inclined surface 9-3 and the first upper surface 9-1 described with reference to FIG. 1, and in which the other side is provided with the same first inclined surface and the same first upper surface. In other words, the cover member 4 according to the third modification example has a laterally symmetrical structure with respect to the center line CLI, including the pressure-sensitive detection member 5 and the receiving portion 9.

In this manner, pull-out from the inner side of the vehicle is detected when the second pressure-sensitive detection member arranged on the other side is pressed against the newly provided opposing first inclined surface and the newly provided first upper surface, and is crushed. In addition, pinching is detected when the two pressure-sensitive detection members are pressed against the receiving portion 9 and are crushed. Pull-out from the outer side of the vehicle is detected in the same manner as described with reference to FIG. 1.

Therefore, the pinch detection switch according to the third modification example makes it possible to detect pinching and pull-out toward the outer side of the vehicle as well as pull-out toward the inner side of the vehicle. In addition, the pinch detection switch has the hollow portion 6, whereby the pinch detection switch is also provided with cushioning.

Second Embodiment

Figure 6:
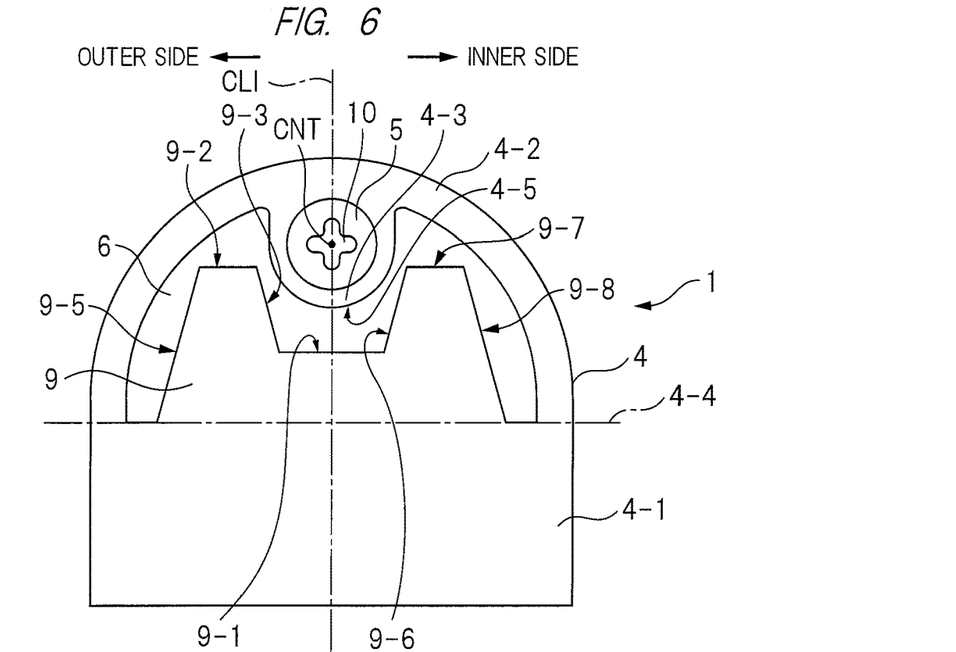
FIG. 6 is a cross-sectional view showing a configuration of the pinch detection switch according to a second embodiment.

FIG. 6 is a cross-sectional view showing a configuration of the pinch detection switch 1 according to a second embodiment. In the first embodiment, the pinch detection switch 1 comprising the receiving portion 9 configured to receive the pressure-sensitive detection member 5 at two surfaces or in two directions has been described. In the second embodiment and a third embodiment described below, there is provided a pinch detection switch comprising a receiving surface configured to receive the pressure-sensitive detection member 5 at three surfaces or in three directions.

In the pinch detection switch 1 according to the second embodiment, the pressure-sensitive detection member 5 is arranged on the base portion 4-1 such that the center point CNT of the pressure-sensitive detection member 5 is on the center line CLI. In addition, the outer shape of the receiving portion 9 is concave, and the receiving portion 9 is arranged on the base surface 4-4 such that the concave portion faces toward the pressure-sensitive detection member 5. In this manner, the cover member 4 is laterally symmetrical with respect to the center line CLI. In addition, the receiving portion 9 is also laterally symmetrical with respect to the center line CLI.

As shown in FIG. 6, the concave portion which is the receiving portion 9 comprises the first upper surface 9-1, the second upper surface 9-2, a third upper surface 9-7, the first inclined surface 9-3, the second inclined surface 9-5, a fourth inclined surface 9-6, and a fifth inclined surface 9-8. Among these surfaces, the first upper surface (bottom surface) 9-1, the first inclined surface 9-3, and the fourth inclined surface 9-6 act as receiving surfaces configured to receive the pressure-sensitive detection member 5 at the time of pinching or pull-out.

In other words, at the time of pinching, the deformation portion 4-2 is moved toward the first upper surface 9-1 of the receiving portion, whereby the pressure-sensitive detection member 5 comes in contact with the first upper surface 9-1 via the cover part 4-3, and the pressure-sensitive detection member 5 is deformed so as to be crushed. In addition, at the time of pull-out toward the outer side of the vehicle, the pressure-sensitive detection member 5 comes in contact with the first inclined surface 9-3 via the cover part 4-3, then comes in contact with the first upper surface 9-1, and the pressure-sensitive detection member 5 is deformed so as to be crushed as in the first embodiment. Further, at the time of pull-out toward the inner side of the vehicle, the pressure-sensitive detection member 5 comes in contact with the fourth inclined surface 9-6 via the cover part 4-3, then comes in contact with the first upper surface 9-1, and the pressure-sensitive detection member 5 is deformed so as to be crushed.

As a result, the pinch detection switch 1 according to the second embodiment is capable of detecting pinching, pull-out toward the outer side of the vehicle, and pull-out toward the inner side of the vehicle. It is needless to say that the cover member 4 is provided with the hollow portion 6, whereby it is possible to prevent loss of cushioning.

Third Embodiment

Figure 7:
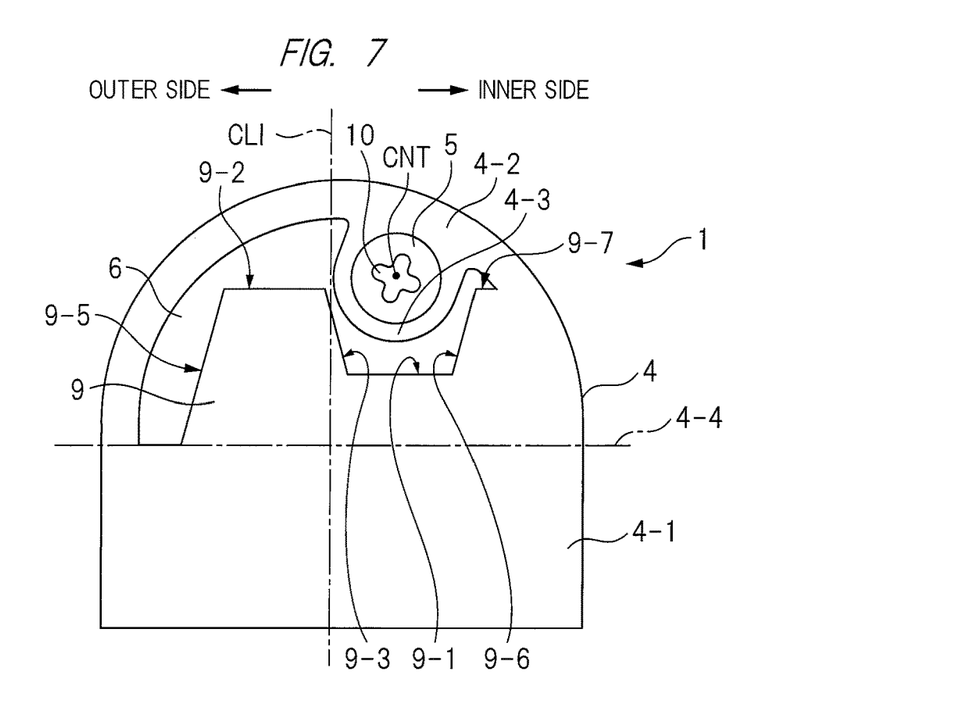
FIG. 7 is a cross-sectional view showing a configuration of the pinch detection switch according to a third embodiment.

FIG. 7 is a cross-sectional view showing a configuration of the pinch detection switch 1 according to the third embodiment. As shown in FIG. 7, in the third embodiment, the pressure-sensitive detection member 5 is arranged on one side with respect to the center line CLI, that is, on the inner side of the vehicle. In addition, the receiving portion 9 is constituted by a protruding portion having an outer shape with a concave portion facing the pressure-sensitive detection member 5. In FIG. 7, the concave portion of the receiving portion 9 is formed by the upper surface 9-1, and the first inclined surface 9-3 and the fourth inclined surface 9-6 connected to the upper surface 9-1. In other words, it can be understood that the receiving portion 9 according to the third embodiment has a structure in which the concave portion described in the second embodiment is shifted to one side (right side in FIG. 7) on the base surface 4-4, and in which the fifth inclined surface 9-8 is integral with the cover member 4. In other words, in the third embodiment, it can be understood that the concave portion is unevenly provided in the cover member 4.

In the third embodiment, as described in the second embodiment, the first upper surface 9-1, the first inclined surface 9-3, and the fourth inclined surface 9-6 act as receiving surfaces configured to receive the pressure-sensitive detection member 5. As a result, in the pinch detection switch 1 according to third embodiment, it is possible to detect pinching, pull-in toward the outer side of the vehicle, and pull-in toward the inner side of the vehicle.

In FIG. 7, the upper surface denoted by reference sign 9-7 is illustrated as a surface of the receiving portion 9. However, this upper surface 9-7 does not need to be provided. In addition, FIG. 7 shows an example in which the pressure-sensitive detection member 5 and a recess of the receiving portion 9 are arranged on one side with respect to the center line CLI. However, the present invention is not limited to such a configuration. In other words, the pressure-sensitive detection member 5 and the recess of the receiving portion 9 may be arranged on the other side with respect to the center line CLI. Unlike the pinch detection switch described in the second embodiment, the pinch detection switch 1 according to the third embodiment is configured such that the cover member 4 and the receiving portion 9 have laterally asymmetric structures with respect to the center line CLI.

As in the first embodiment, in the second and third embodiments, the receiving portion 9 is formed from rubber like the cover member 4. However, the receiving portion 9 may be integrally formed with the cover member 4, or may be a separate member from the cover member 4. Likewise, the pressure-sensitive detection member 5 may be integrally formed with the cover member 4, or may be a separate member from the cover member 4.

Note that, in the embodiments, the first inclined surface 9-3, the first upper surface 9-1, and the fourth inclined surface have been described as flat surfaces. However, as long as effects of the present invention can be achieved, the first inclined surface 9-3, the first upper surface 9-1, and the fourth inclined surface are not limited to be flat surfaces, and may be curved surfaces.

The first to third embodiments have been described as pinch detection switches. However, it can be understood that each of these embodiments also includes a pinch detection method comprising one tubular pressure-sensitive detection member 5 having the plurality of electrode wires ED1 to ED4 spaced apart from one another, and the cover member 4 covering the pressure-sensitive detection member and having the hollow portion 6.

In the foregoing, the invention made by the present inventors has been concretely described based on the embodiments. However, it is needless to say that the present invention is not limited to the foregoing embodiments, and various modifications and alterations can be made without departing from the gist of the present invention. For example, the embodiments have been described with the invention applied to an automobile. However, the invention is not limited to be applied to an automobile, and may be applied to a railway train, a platform door, an elevator, or a rear door.

What is claimed is:

1. A pinch detection switch comprising one tubular pressure-sensitive detection member having a first hollow portion and a plurality of electrode wires spaced apart from one another by the first hollow portion, the plurality of electrode wires being formed in a spiral shape extending along a longitudinal direction of the pressure-sensitive detection member, and a cover member covering the pressure-sensitive detection member, wherein, when the cover member is viewed in cross section, the cover member comprises a base portion, a second hollow portion, and a deformation portion provided on the base portion so as to cover the second hollow portion of the cover member, the pressure-sensitive detection member is arranged in the deformation portion, a receiving portion configured to receive the pressure-sensitive detection member is arranged on the base portion, the receiving portion has at least two substantially planar receiving surfaces formed at positions facing the pressure-sensitive detection member, the at least two receiving surfaces being configured to receive the pressure-sensitive detection member, and wherein, when the cover member is viewed in cross section, the receiving portion has a protruding shape protruding in a stepwise manner from the base portion toward the deformation portion, and in the protruding shape, an upper surface and an inclined surface facing the pressure-sensitive detection member act as the two receiving surfaces.

2. The pinch detection switch according to claim 1, wherein an angle between the upper surface and the inclined surface is within a range of 90 degrees or more and less than 180 degrees.

3. The pinch detection switch according to claim 2, wherein the deformation portion comprises a cover part covering the pressure-sensitive detection member and facing the upper surface and the inclined surface.

4. The pinch detection switch according to claim 1, wherein, when the cover member is viewed in cross section, the pressure-sensitive detection member is arranged at a position away from a center line passing through the base portion and the deformation portion, and when the cover member is viewed in cross section, the receiving portion is asymmetric with respect to the center line.

5. The pinch detection switch according to claim 1, wherein the receiving portion has three receiving surfaces formed at positions facing the pressure-sensitive detection member, the three receiving surfaces being configured to receive the pressure-sensitive detection member.

6. The pinch detection switch according to claim 5, wherein, when the cover member is viewed in cross section, the receiving portion comprises a concave surface facing the pressure-sensitive detection member, and the concave surface is the receiving surface.

7. The pinch detection switch according to claim 6, wherein, when the cover member is viewed in cross section, the pressure-sensitive detection member and the concave surface are arranged at positions on a center line passing through the base portion and the deformation portion.

8. The pinch detection switch according to claim 6, wherein, when the cover member is viewed in cross section, the pressure-sensitive detection member and the concave surface are unevenly provided in the cover member.

9. A pinch detection switch comprising one tubular pressure-sensitive detection member having a first hollow portion and a plurality of electrode wires spaced apart from one another by the first hollow portion, the plurality of electrode wires being formed in a spiral shape extending along a longitudinal direction of the pressure-sensitive detection member, and a cover member covering the pressure-sensitive detection member, wherein, when the cover member is viewed in cross section, the cover member comprises a base portion, a second hollow portion, and a deformation portion provided on the base portion so as to cover the second hollow portion of the cover member, the pressure-sensitive detection member is arranged in the deformation portion, a receiving portion configured to receive the pressure-sensitive detection member is arranged on the base portion,
- the receiving portion has substantially planar receiving surfaces formed at a position facing the pressure-sensitive detection member, the receiving surface being configured to receive the pressure-sensitive detection member in at least two directions, and
- wherein, when the cover member is viewed in cross section, the receiving portion has a protruding shape protruding in a stepwise manner from the base portion toward the deformation portion, and
- in the protruding shape, an upper surface and an inclined surface facing the pressure-sensitive detection member act as the two receiving surfaces.

10. A pinch detection switch comprising one tubular pressure-sensitive detection member having a first hollow portion and a plurality of electrode wires spaced apart from one another by the first hollow portion, the plurality of electrode wires being formed in a spiral shape extending along a longitudinal direction of the pressure-sensitive detection member, a cover member having a deformation portion covering the pressure-sensitive detection member, and a receiving portion forming a second hollow portion between the receiving portion and the deformation portion,
- wherein the pressure-sensitive detection member is a separate member from the cover member,
- the receiving portion has at least two substantially planar receiving surfaces formed such that the pressure-sensitive detection member is pressed against the at least two substantially planar receiving surfaces when an object is pinched and the deformation portion and the first and second hollow portions are deformed, and
- wherein, when the cover member is viewed in cross section, the receiving portion has a protruding shape protruding in a stepwise manner from the base portion toward the deformation portion, and
- in the protruding shape, an upper surface and an inclined surface facing the pressure-sensitive detection member act as the two receiving surfaces.

11. The pinch detection switch according to claim 10, wherein the deformation portion has a cover part interposed between the pressure-sensitive detection member and the receiving portion facing the pressure-sensitive detection member.

12. The pinch detection switch according to claim 10, wherein, when the cover member is viewed in cross section, the receiving portion is asymmetric with respect to a center line of the cover member.

13. A pinch detection switch comprising one tubular pressure-sensitive detection member having a first hollow portion and a plurality of electrode wires spaced apart from one another by the first hollow portion, the plurality of electrode wires being formed in a spiral shape extending along a longitudinal direction of the pressure-sensitive detection member, a cover member having a deformation portion covering the pressure-sensitive detection member, and a receiving portion forming a second hollow portion between the receiving portion and the deformation portion,
- wherein the pressure-sensitive detection member is a separate member from the cover member,
- the receiving portion has substantially planar receiving surfaces configured to receive the pressure-sensitive detection member in at least two directions when the pressure-sensitive detection member is pressed against the receiving surface when an object is pinched and the deformation portion and the first and second hollow portions are deformed, and
- wherein, when the cover member is viewed in cross section, the receiving portion has a protruding shape protruding in a stepwise manner from the base portion toward the deformation portion, and
- in the protruding shape, an upper surface and an inclined surface facing the pressure-sensitive detection member act as the two receiving surfaces.

14. The pinch detection switch according to claim 13, wherein, when the cover member is viewed in cross section, the receiving portion has a concave surface facing the pressure-sensitive detection member, and the concave surface is the receiving surface.

15. The pinch detection switch according to claim 14, wherein, when the cover member is viewed in cross section, the pressure-sensitive detection member and the concave surface are arranged at positions on a center line of the cover member.

16. A pinch detection switch comprising a pressure-sensitive detection member having a first hollow portion and a plurality of electrode wires spaced apart from one another by the first hollow portion and formed in a spiral shape extending along a longitudinal direction of the pressure-sensitive detection member, a cover member having an elastic deformation portion on which an object comes in contact, and a receiving portion forming a second hollow portion between the receiving portion and the deformation portion,
- wherein the receiving portion is formed such that, when the object is pinched and the deformation portion is deformed, two substantially planar receiving surfaces against which the pressure-sensitive detection member is pressed have a predetermined angle,
- pinching of the object is detected when the pressure-sensitive detection member is pressed against the receiving surface and is deformed so as to be crushed, and
- wherein, when the cover member is viewed in cross section, the receiving portion has a protruding shape protruding in a stepwise manner from the base portion toward the deformation portion, and
- in the protruding shape, an upper surface and an inclined surface facing the pressure-sensitive detection member act as the two receiving surfaces.

17. The pinch detection switch according to claim 16, wherein, when the cover member is viewed in cross section, the receiving portion is asymmetric with respect to a center line of the cover member.

18. The pinch detection switch according to claim 16, wherein, when the cover member is viewed in cross section, the receiving portion comprises a concave surface facing the pressure-sensitive detection member, and the concave surface is the receiving surface.

19. The pinch detection switch according to claim 18, wherein, when the cover member is viewed in cross section, the pressure-sensitive detection member and the concave surface are arranged at positions on a center line of the cover member.

20. The pinch detection switch according to claim 16, wherein the receiving portion is integral with the cover member.

* * * * *